April 12, 1949.　　B. F. BIRDWELL ET AL　　2,467,074
SHOWER BATH RECEPTOR
Filed May 9, 1945
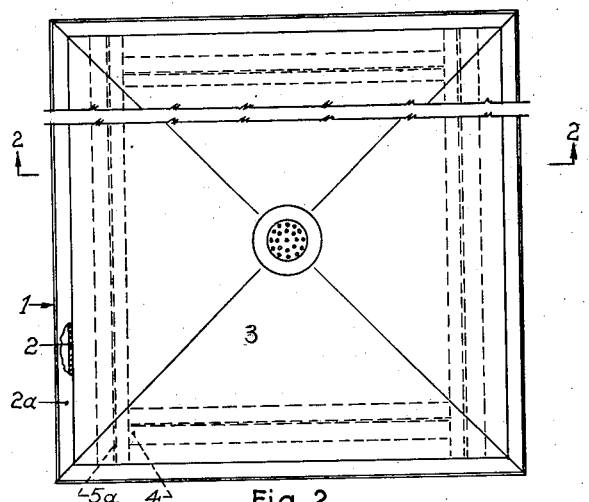
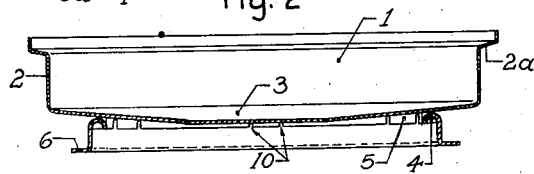
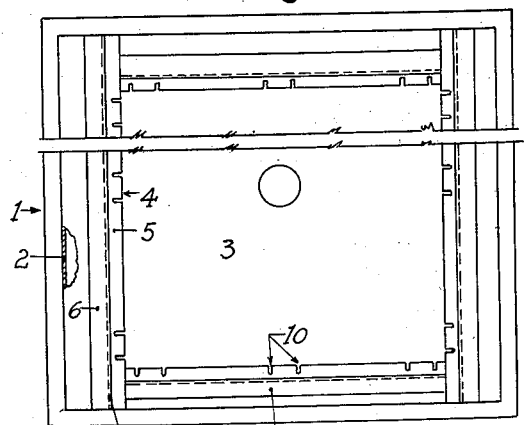
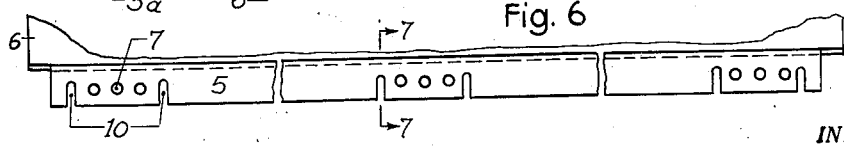
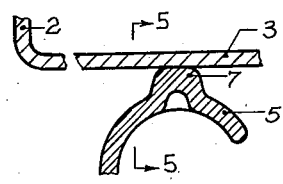
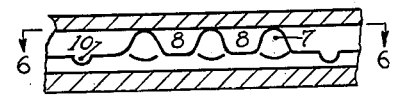
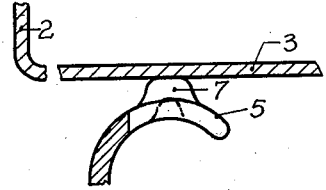
INVENTOR.
Benjamin F. Birdwell &
Charles T. Gordon
BY Arthur H. Robert
Atty.

Patented Apr. 12, 1949

2,467,074

UNITED STATES PATENT OFFICE 2,467,074

SHOWER BATH RECEPTOR

Benjamin F. Birdwell and Charles T. Gordon, Louisville, Ky., assignors to Porcelain Metals Corporation, Louisville, Ky., a corporation of Kentucky Application May 9, 1945, Serial No. 592,788

6 Claims. (Cl. 189—2)

This invention relates to shower bath receptors of the type having an upper pan, the surface of which forms a shower cabinet floor, and a lower base rim providing a foundation for the pan. Normally the pan and rim are made of the lightest gauge sheet metal considered practical and assembled by resting the pan upon the rim and securing the upper joint surface of the pan, which is provided by the marginal portion of its bottom face, to the opposed lower joint surface of the rim, which is provided by a marginal securing flange at its upper end.

It has been proposed: to shape the upper marginal or securing flange of the rim more or less semi-circularly so that its joint surface curves convexly in cross section; to provide such flange with a continuous succession of upwardly projecting protuberances positioned along the top of its curvature; and to spot weld the joint surface of the pan to the tops of these protuberances. The resulting receptor has the advantages first of spacing all opposed surfaces along the joint line sufficiently to enable them to be pickled clean and then to be coated with enough enamel to fill and seal the joint line space between them and second of producing an enameled receptor which can be constructed with extremely light-gauge metal and yet remain quiet, sturdy and completely rust proof. It has the disadvantage of a relatively high welding cost since welding difficulties are encountered when attempts are made to spot weld more than one protuberance at a time. Thus, with protuberances spaced approximately 2 inches apart, a four sided unit dimensioned 32 to 36 inches square involves sixteen to eighteen spot welding operations on each side.

The principal object of the present invention is to overcome this limitation and enable a cluster of two or more protuberances to be simultaneously welded without encountering said welding difficulties.

It has also been proposed to reduce the size of the rim relatively to the pan so that the joint line between the rim and the pan extends, in relation to the pan, a few inches inwardly from the marginal portion of its bottom face. In this way, the rim is positioned to support the pan at an intermediate floor area where it is effective to decrease floor deflection during use. While this arrangement obviously could be successfully employed with relatively heavy gauge sheet metal, it has not heretofore been successfully employed with the light gauges of sheet metal normally used because a load, imposed on the pan at an area located on the inner side of the rim, tends to deflect, and thus move, the light gauge floor of the pan about the flange of the base rim, which acts as a fulcrum, and a normal load is often sufficient to fracture the enamel at the spot welded areas and, in some cases, fracture the spot weld bond also.

Another important object is to overcome this limitation and permit the securing flange of the rim to be spot welded to the pan along an intermediate joint line positioned inwardly from the margin of the bottom face of the pan without subjecting the unit to ready fracture of a spot welded bond or of the enamel adjacent such bond.

A receptor embodying the invention is illustrated in the accompanying drawing wherein:

Figure 1 is a top plan view;

Figure 2 is a section along line 2—2 of Figure 1, before the receptor is enameled;

Figure 3 is a bottom plan view;

Figure 4 is an enlarged joint line detail of Figure 2;

Figure 5 is a fragmentary sectional view taken along line 5—5 of Figure 4, this view showing two sections of protuberances;

Figure 6 is a section along line 6—6 of Figure 5; and

Figure 7 is a section along line 7—7 of Figure 5.

The receptor illustrated conventionally includes: an upper pan 1 having side walls 2 and bottom wall 3, the latter wall forming the floor of the receptor; a lower foundation or base rim 4 having an inwardly directed upper marginal flange 5 and an outwardly directed lower marginal flange 6, the upper marginal flange 5 being curved more or less semi-circularly so as to provide a joint surface which curves convexly; and a series of protuberances 7 integrally formed on the joint surface of the rim, at the top of its curvature to extend upwardly therefrom, and spot welded at their upper ends to the joint surface of the pan, the protuberances being vertically dimensioned to provide a space 8 between the opposed joint surfaces sufficient to permit the flow therebetween of liquid materials, such as pickling and enameling bath materials, and being horizontally spaced along the joint line surface at intervals sufficiently frequent to avoid appreciable enamel fracture adjacent any protuberance welded area when a normal load is concentrated on any section of the pan.

Good results have heretofore been secured with protuberances initially dimensioned about 3/32 of an inch in both height and diameter and spaced about 2 inches apart. During projection welding, these protuberances will be decreased from 1/16 to 3/32 of an inch in height and correspondingly flattened out. The resulting space 8, between opposed join surfaces of the rim and pan, will normally be sufficient to accommodate the flow of pickling and of enameling material and consequently insures the production of a clean joint line surface during pickling and a coated joint line surface during enameling and firing. By curving the securing flange 5 of the rim, the height of the space 8 increases outwardly in both directions from its center and thus provides access from both sides for pickling and coating purposes and correspondingly permits the height of the central part of that space to be much smaller than would be possible with a straight flange. With this arrangement, the joint line space 8 will normally be completely sealed by the enamel coating.

As previously noted, enameled receptors of this construction can be made with extremely light-gauge metal and yet remain quiet, sturdy and completely rust proof. However, it has the disadvantage of requiring the spot welding operations to be performed one at a time. We have found that when a cluster of two or more protuberances are welded simultaneously, the welds of the first cluster will normally be perfect but, on succeeding clusters, difficulty is encountered in securing good welding contact with the result that some protuberances are imperfectly welded and, in some instances, the welding current will flow through the protuberances of a previously welded cluster to an extent sufficient to damage such weld. The cause for this was not readily ascertained but after considerable work and study, we concluded that when two or more protuberances were simultaneously welded, the decrease in the space 8 along the welded area caused the metal to deflect in such a way that the height of the space 8 increased from the welded area progressively through the adjacent unwelded areas making the securement of proper welding contact progressively more difficult in such adjacent areas.

We have found that this limitation can be completely overcome by slitting, preferably slotting, the securing flange 5 transversely at opposite ends of each welding area to enable that section of the flange to be flexed independently of the adjacent sections thereof. Where two or more protuberances are contained on one section of the flange and that section is arranged to flex independently of adjacent sections it becomes possible to spot weld all protuberances on such section simultaneously and perfectly even after the sections at its opposite ends are previously welded. We have found that a slight degree of independent flexure of one section relatively to adjacent sections is amply sufficient to avoid the welding difficulties heretofore encountered when attempting to weld successive clusters containing two or more protuberances. Accordingly, where a series or cluster of two or more protuberances are to be welded simultaneously, the securing flange 5 is provided with slots 10 at each end of the cluster, these slots extending from the free edge of the flange transversely across the top of the flange. We have obtained excellent results by providing slots at each end of a series of three successive protuberances and causing said slots to extend transversely across the flange 5 from the free edge beyond a vertical plane passing centrally through all of the aligned protuberances at the top of the curvature of the flange and preferably terminating adjacent to an outside line passing along the outer vertical face of such protuberances. Naturally the length of this slot or cut may vary but it should be restricted to an extent sufficient to give the desired flexibility to the flange without unduly weakening its mechanical strength. A variation of 1/8 of an inch on either side of said outside line is satisfactory.

The slots 10 have the additional advantage of permitting a substantial reduction in the number of protuberances otherwise required. As previously noted, the protuberances have heretofore been spaced 2 inches apart so that sixteen to eighteen protuberances had to be separately welded on each side of the rim. The slots 10, however, make it possible to reduce the number of protuberances down to eight or nine and the welding operations down to three or four on each side. For example, with eight protuberances, four spot welding clusters could be provided along each side, each cluster containing two protuberances spaced about 3/4 inch apart with the slots 10 at each end of the cluster spaced about 1/2 inch from the adjacent end protuberance. These four clusters would, of course, require four separate welding operations. We prefer, however, to provide three clusters along each side, each cluster containing three protuberances spaced approximately 3/4 of an inch apart with the slots spaced 1/2 inch from each end protuberance. These clusters are spaced symmetrically along each side wall as, for example, with one cluster at the center and one adjacent each end of each wall. This arrangement involves only three welding operations and has been found to produce exceptionally good results.

As we have previously noted, it is also desirable to reduce the size of the rim relatively to the pan so that the joint line between the rim and the pan extends, in relation to the pan, a few inches inwardly from the marginal portion of its bottom face. Thus, for example, if we assume that the receptor illustrated approximates 32 inches square with the upper horizontal flange 2a of the pan approximating 1 inch in width, then the bottom face of the floor area 3 will approximate 30 inches square. This bottom face may be divided by concentrically arranged lines approximating 30 x 30, 28 x 28 and 20 x 20, into three zones, namely, a marginal zone, which is 1 inch wide on each side, a centrally disposed zone, which is 20 inches wide from one side to the other and an interposed zone which is 4 inches wide on each side, the latter zone being, of course, interposed between the central and marginal zones.

Normally, the side walls of the base rim for such receptor will define an opening approximating 30 inches square; hence, the side walls of such receptor will underlie the outer limits of the marginal zone. It is desirable, however, to reduce the size of the base rim so that its side walls underlie the interposed zone. Preferably the side walls centrally underlie that zone; hence, extend inwardly approximately 3 inches from the marginal edge of the bottom face of the floor 3. Before passing it may be noted that a receptor having a bottom face approximating 34 inches square will have a marginal zone approximating 1 inch in width on each side, an interposed zone approximating 5 inches in width on each side and a central zone approximating 22 inches in width from side to side.

While a rim of reduced size will tend to decrease the deflection of the floor under load, it will not eliminate it entirely with the lighter gauges of sheet metal. On the contrary a load centrally imposed on the floor 3 will still tend to deflect the floor about the flange 5 of the base rim, which acts as a fulcrum, and such deflection, even when occasioned by a normal load, may often be sufficient to fracture the enamel at the spot welded areas joining the rim and pan and, in some cases, fracture one or more of the spot welding bonds also. We have found, however, that such fracture is prevented by the slots 10 because, by imparting independent flexibility to adjacent sections of the flange, they permit the section receiving the greatest strain to give slightly more than adjacent sections and thus prevent a damaging strain from being imposed upon it.

With the reduced rim, however, we prefer to extend the length of two opposed side walls of the rim outwardly to the marginal edge of the bottom face as indicated in 5a. Preferably the side walls, which are lengthened, are those running from the front or entrance side of the receptor to the rear side because the extensions, when so positioned, will reduce any tendency of the receptor to rock when a load is imposed on its front margnal edge, for example. The extensions 5a are not usually welded to the pan because the floor 3 normally slopes upwardly away from the extensions.

It will be readily appreciated that important objects of this invention will be achieved by any means of transversely weakening the securing flange 5 sufficiently to render one section independently flexible relatively to the adjacent sections. Since one section need only be independently flexible to a slight degree, such flexibilty can obviously be obtained by using, in place of a slot 10, either a large perforation or a series of small closely spaced perforations. It will also be appreciated that the invention may be advantageously applied to various articles such as sheet metal cabinets and the like wherein one sheet metal part having a securing flange, cooperates with another sheet metal part to present opposed joint surfaces which are secured together by a series of interposed protuberances laterally spaced along the opposed joint surfaces and integrally formed on one joint surface to project vertically therefrom with its projecting end welded to the opposed joint surface.

Having described our invention, we claim:

1. A bath receptor comprising: a base rim having side walls and an upper securing flange presenting an upwardly facing joint surface; a pan arranged over the rim to present a downwardly facing joint surface in opposed relationship to said upwardly facing joint surface; a series of protuberances laterally spaced along and interposed between said opposed joint surfaces and integrally formed on the joint surface of one part to project vertically therefrom with their projecting ends welded to the opposed joint surface to space the pan from the rim; and a series of slots transversely dividing the securing flange into a series of relatively flexible sections, each containing at least one protuberance.

2. The receptor of claim 1 wherein: each of said flexible rim sections contains a cluster of protuberances; and said slots at each end of the section extend from the free edge of said flange transversely beyond a vertical plane passing through the centers of the protuberances on the section and terminate adjacent a line extending along the outer edges of such protuberances.

3. The receptor of claim 1 wherein: the side walls of the rim are spaced inwardly from the adjacent edges of the pan to underlie an intermediate portion of said pan between the center and the edges thereof.

4. The receptor of claim 1 wherein: the bottom face of the pan presents a marginal zone, an inwardly spaced central zone and an interposed zone between the marginal and central zone; and the side walls of the rim are spaced inwardly from the adjacent edges of the pan to underlie an intermediate portion of the pan between the center and the edges thereof, at least two opposed side walls of the base rim being extended lengthwise substantially to the marginal edge of the bottom face of the pan.

5. A bath receptor comprising: a base rim having side walls and an upper securing flange presenting an upwardly facing joint surface; a pan arranged over the rim to present a downwardly facing joint surface in opposed relationship to said upwardly facing joint surface; a series of clusters of protuberances laterally spaced along and interposed between said opposed joint surfaces; the protuberances in each cluster being integrally formed on the joint surface of one part to project vertically therefrom with their projecting ends welded to the opposed joint surface to space the pan from the rim; and a series of slots transversely dividing the securing flange into a series of relatively flexible sections, with one slot positioned adjacent each end of each cluster of protuberances.

6. A bath receptor comprising: a base rim having side walls and an upper securing flange presenting an upwardly facing joint surface; a pan arranged over the rim to present a downwardly facing joint surface in opposed relationship to said upwardly facing joint surface; a series of protuberances laterally spaced along and interposed between said opposed joint surfaces and integrally formed on the joint surface of one part to project vertically therefrom with their projecting ends welded to the opposed joint surface to space the pan from the rim; and means transversely weakening the securing flange at spaced intervals to divide it into a series of relatively flexible sections, each containing at least one protuberance.

BENJAMIN F. BIRDWELL.
CHARLES T. GORDON.

REFERENCES CITED

The following references are of record in the file of this patent:

UNITED STATES PATENTS

| Number | Name | Date |
|--------|------|------|
| 945,554 | Lachman | Jan. 4, 1910 |
| 1,017,167 | Pleins | Feb. 13, 1912 |
| 1,369,109 | Huston | Feb. 22, 1921 |
| 1,690,377 | Pugh | Nov. 6, 1928 |